Sept. 26, 1939.                    E. C. READ                    2,174,391
                                    GOVERNOR
                              Filed June 3, 1937                 2 Sheets-Sheet 1

INVENTOR
EVERETT C. READ
BY John W. Michael
ATTORNEY

Sept. 26, 1939.　　　　E. C. READ　　　　2,174,391
GOVERNOR
Filed June 3, 1937　　　2 Sheets-Sheet 2

INVENTOR
EVERETT C. READ
BY John W. Michael
ATTORNEY

Patented Sept. 26, 1939

2,174,391

UNITED STATES PATENT OFFICE 2,174,391

GOVERNOR

Everett C. Read, Milwaukee, Wis., assignor to The Filer & Stowell Co., Milwaukee, Wis., a corporation of Wisconsin Application June 3, 1937, Serial No. 146,167

17 Claims. (Cl. 121—174)

This invention relates to a governor for use on steam engines and while capable of advantageous use in many applications, is particularly designed and adapted for use with direct driven compressors employed with air conditioning equipment or refrigerating apparatus.

One of the objects of the invention is to provide a governor of this character which is capable of maintaining the engine at a constant speed under varying loads and yet makes practical and convenient the selection of any one of a wide range of speeds. The construction is such that the range of available speeds which may be maintained by the governor is very greatly increased over that available with governors heretofore proposed or used.

Another object of the invention is to provide a governor having these advantages and capacities and which is simple and compact in construction, reliable and effective in operation, easily regulated to maintain the selected speed, and susceptible of economical manufacture and installation.

The governor contemplated by the present invention is of the automatic or cutoff type wherein the power developed by the engine is changed by varying the point of cutoff or changing the length of time during which the valve is open to maintain a constant speed under varying loads. One way in which this may be accomplished is by causing the eccentric which operates the valves to be shifted automatically relative to the main shaft to increase or decrease its throw and thus change the travel of the valve.

In carrying out the present invention an unbalanced inertia weight is pivotally supported on the fly wheel and is connected to the valve operating eccentric which, while rotatable with the fly wheel and the engine shaft, may shift or swing relative to the engine shaft to increase or decrease its throw. Two springs are combined with the inertia weight, one designed to oppose motion of the weight under the action of centrifugal force and the other to supplement the action of centrifugal force, the first spring applying more force to the inertia weight than the latter. Each of these springs has one end anchored to the fly wheel. An adjustable connection is provided between the other end of each spring and the inertia weight. These adjustable connections are located on the opposite sides of the pivotal axis of the inertia weight and are so combined therewith that when shifted they not only change the distance or lever arm between themselves and the axis of rotation of the inertia weight but also vary the tension of the springs. The adjustable connections are tied together so as to be constrained to partake of motion in opposite directions, that is, as one moves toward the pivotal axis of the inertia weight, the other moves away from said axis and vice versa. A small electrical motor is mounted on the fly wheel and is connected by linkage or a suitable motion transmission train with the adjustable connections. The electric motor is reversible and is run in one direction or the other depending upon whether it is desired to increase or decrease the speed for which the governor is set. Any suitable means may be provided for controlling the energization and direction of rotation of the electric motor. When the operation of the motor is stopped the governor remains set for the then selected speed.

Other objects and advantages reside in certain novel features of the construction, arrangement and combination of parts which will be hereinafter more fully pointed out in the appended claims, reference being had to the accompanying drawings forming a part of this specification and in which:

Figure 1:
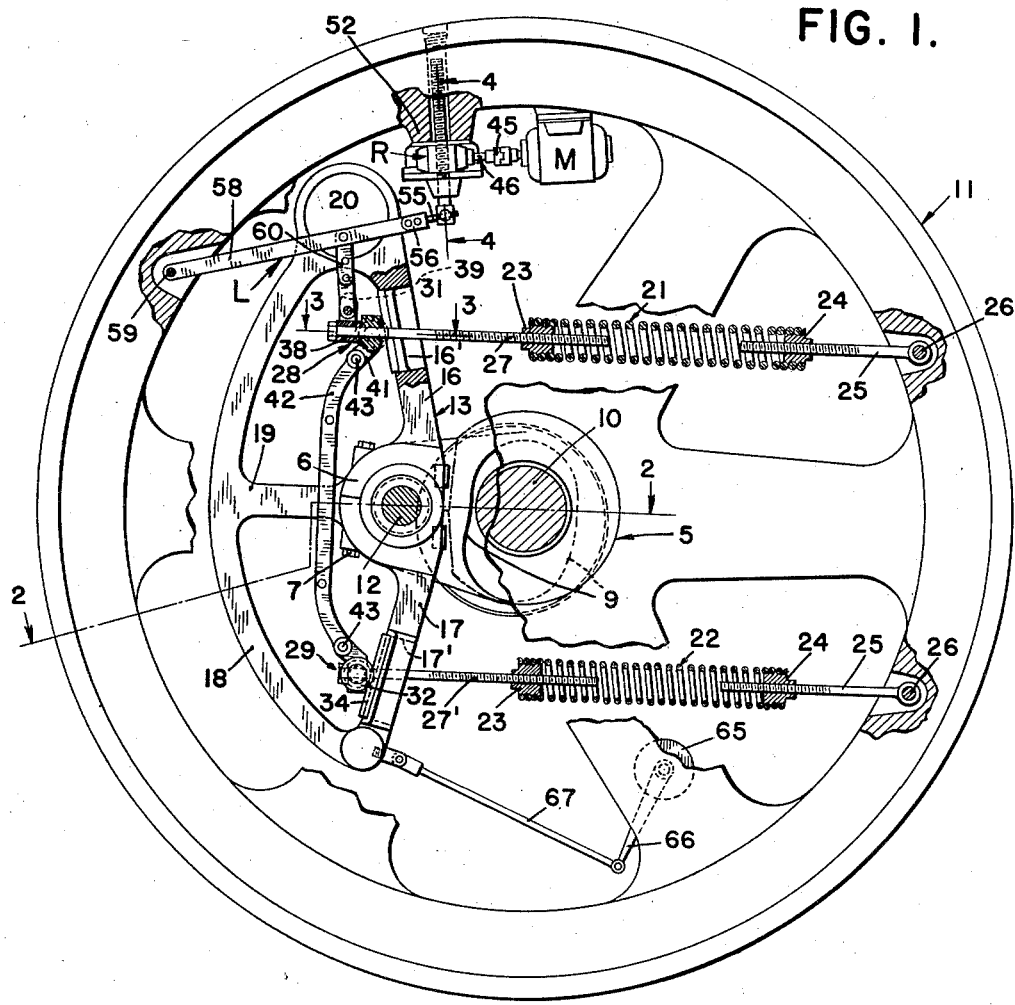
Figure 1 is a view in side elevation showing a governor embodying the present invention, parts being broken away and shown in section for the sake of illustration.
Figure 3:
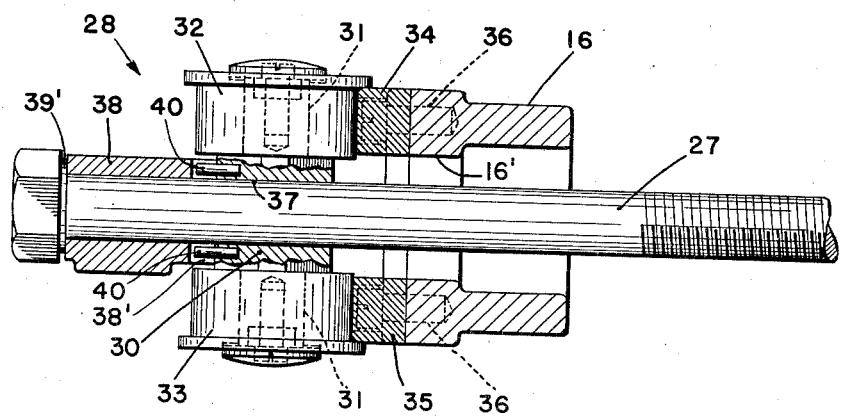
Figure 4:
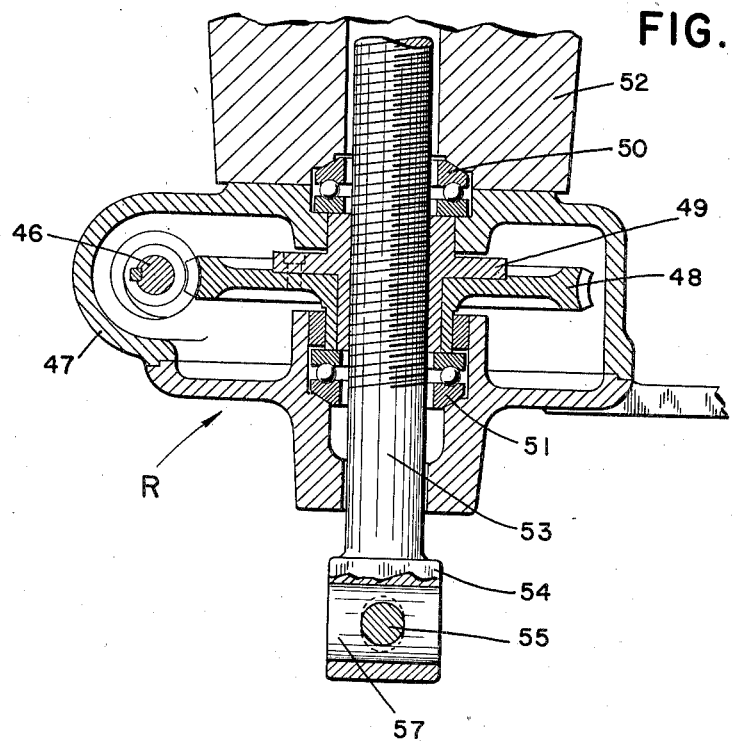

Figures 3 and 4 are fragmentary sectional views taken on lines 3—3 and 4—4 respectively of Figure 1 and looking in the direction of the arrows.

Referring to the drawings the numeral 10 designates the main shaft or engine shaft. A fly wheel 11 is suitably fixed to this shaft 10 for rotation therewith.

A pivot pin 12 is secured in a suitable opening provided therefor in one of the spokes of the fly wheel adjacent its hub and projects laterally therefrom. An inertia weight designated generally at 13 has its hub 14 rotatably fitted and supported upon the projecting portion of this pin 12 and is held against axial displacement off the end of the pin in any suitable way, for example, by means of a retaining washer 15 and stud screw 15' shown to advantage in Figure 2.

The inertia weight 13 is made up of the hub 14, two inclined or slanting bars 16 and 17, a segmental connecting bar 18, and a central connecting arm 19 integral with the segmental bar 18 and with the hub 14. One side of the inertia weight is provided with a circular portion 20 to which any suitable number of weights may be secured. The side of the inertia bar on which the circular portion 20 is formed is heavier than the other side and this heavier side tends to swing outwardly under the influence of centrifugal force when the engine is running.

Figure 2:
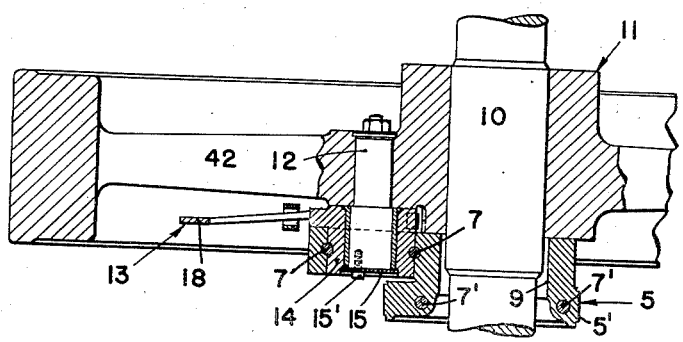
Figure 2 is a fragmentary sectional view taken on line 2—2 of Figure 1.

In the present construction the valve operating eccentric is designated generally at 5 and is made in two sections having attaching portions 6 designed to snugly fit about and be secured to the hub 14 of the inertia weight, as will be understood from Figures 1 and 2. The sections of the eccentric are held together and are fixed to the hub 14 of the inertia weight by suitable means, for example by bolts and nuts 7 and 7', the former also serving to key the attaching portions 6 of the eccentric to the hub 14 of the inertia weight in the manner indicated in Figure 2. It is also feasible in many instances to cast the eccentric integral with the inertia weight, but assembly is in many instances facilitated by making the eccentric separate and sectional in the manner described and then suitably fastening the sections together and to the inertia weight. The main portion of the eccentric is provided with an oblong opening 9 through which the engine shaft 10 extends, this opening 9 affording the clearance required for the eccentric to swing relative to the main engine shaft and thereby vary its throw as required. The peripheral portion 5' of the eccentric about which the eccentric strap (not shown) is fitted is offset laterally from the inertia weight and other parts of the governor for operating purposes.

Combined with the inclined bars 16 and 17 of the inertia weight are tension coil springs designated generally at 21 and 22. One end of each of these springs is pivotally anchored on the rim of the fly wheel and the other is adjustably connected with its side or bar of the inertia weight.

For these purposes, end nuts 23 and 24 are interlocked with the end coils or convolutions of each spring, each nut having a helical groove in its periphery in which the end coils of its spring are securely threaded or fitted.

Anchoring screws 25 have their threaded portions threadedly engaged with the internally threaded openings of the nuts 24. Each anchoring screw 25 has an eye at its outer end pivoted as at 26 to the rim of the fly-wheel 11.

Adjusting screws 27 and 27' have their threaded portions threadedly engaged with the internally threaded openings of the nuts 23. The screws 27 and 27' extend through slots 16' and 17' provided in the slanting bars 16 and 17. Adjustable connections designated generally at 28 and 29 are provided between the heads of the screws 27 and 27' and the bars 16 and 17 respectively.

The adjustable connections 28 and 29 (Fig. 3) are similar in construction and each includes a truck frame 30 having integral oppositely extending trunnions 31 on which ball bearing rollers 32 and 33 are rotatably mounted. The ball bearing rollers 32 and 33 ride on hardened steel strips 34 and 35 fastened to the portions of the slanting arms 16 and 17 which parallel the slots 16' and 17' by means of countersunk studs or screws 36. The strips 34 and 35 thus constitute a track along which the ball bearing rollers ride.

Each truck frame 30 is provided with an opening 37 extending entirely therethrough with its axis at right angles to the axis of the trunnions. The unthreaded portions of the adjusting screws 27 and 27' extend freely through these openings. In the case of the adjusting screw 27' its head bears directly against the outer end of the truck frame of adjustable connection 29. The other screw 27 has a sleeve 38 fitted on its shank between its head and the adjacent end of the truck frame, the sleeve 38 having an integral lug 39 to adapt it for connection with the means by which the connections 28 and 29 are adjusted. A washer 39' may be interposed between the head of the screw 27 and the sleeve 38, if desired. Sleeve 38 has its end adjacent the associated truck frame 30 slotted as at 38' to receive dowel pins 40 carried by and projecting from said associated truck frame to maintain the sleeve 38 in proper position on its screw 27.

The truck frames 30 are provided with integral laterally projecting apertured lugs 41 to which the ends of a double tie bar 42 are pivotally connected as at 43 whereby the truck frames are constrained to partake of corresponding movement.

The trucks of the adjustable connections 28 and 29, which trucks are constituted of truck frames 30 and their ball bearing rollers 32 and 33, are caused to ride back and forth along the tracks provided by the steel strips 34 and 35 under the control of a small reversible motor designated generally at M. The motor M is bolted or otherwise suitably fastened to the rim of the fly wheel and acts through a speed reducer designated generally at R and linkage designated generally at L to impart the desired movement to the trucks. The motor is controlled by electrical energy transmitted thereto by collector rings (not shown) as is well known to those skilled in the art.

In the structure illustrated, the armature shaft of the motor M is coupled as at 45 to a worm shaft 46 rotatably supported in suitable bearings provided in the speed reducer casing 47 which is suitably fastened to the fly wheel. The worm meshes with a worm wheel 48 mounted on and fixed to a nut 49 supported for rotation in bearings provided therefor in the casing and having its ends abutting thrust bearings 50 and 51, one engaged with one end of the casing and the other engaged with the portion 52 of the fly wheel to which the speed reducer is secured. A screw 53 is threadedly engaged with the nut and at its lower end has an apertured head 54. The stem 55 of a connecting piece or clevis 56 extends into the aperture of the head and is pivoted thereto by pin 57. The end of the connecting piece opposite the stem is provided with a series of openings whereby it may be adjustably and pivotally connected to one end of lever 58, the opposite end of this lever being pivotally supported as at 59 in a recess provided therefor in the rim of the fly wheel. A link 60 has one end pivotally connected to an intermediate portion of the lever 58 and has its opposite end pivotally connected to the lug 39 of the sleeve 38.

With this construction with the governor set, for example, as shown in Figure 1, and the engine in operation, centrifugal force tends to cause the heavier side of the inertia weight, namely the side thereof in which the slanting bar 16 is incorporated, to swing outwardly away from the axis of rotation. The influence of centrifugal force in this respect is opposed by the action of the spring 21 although supplemented by the action of the spring 22. However, as the spring 21 applies more force to the inertia weight than the spring 22 there is an effective resistance bucking the action of centrifugal force. The particular value of this resistance depends upon the differential action of the springs 20 and 21 and this in turn depends upon the position of the adjustable connections 28 and 29 between the springs 21 and 22 and the inertia weight. If the speed of the engine tends to drop below the selected value the centrifugal force acting on the inertia weight is decreased, and the differential force of the springs will cause the inertia weight to swing in a clockwise direction as viewed in Figure 1 thereby swinging the eccentric 5 to so change the point of cutoff as to bring the speed of the engine up to the selected value. If the engine tends to exceed the speed for which the governor is set, centrifugal force increases and overcomes the differential action of the springs and reversely swings the eccentric and correspondingly changes the cutoff to slow down the engine to the proper speed.

If a higher speed is desired than that obtained with the governor set as shown in Figure 1 the electric motor is energized in such manner as to cause the speed reducer R and linkage L to pull upwardly on the adjustable connections 28 and 29 thereby causing their trucks to ride along the tracks of the slanting bars 16 and 17. This increases the tension of the spring 21 and the lever arm through which it acts and correspondingly decreases the tension of the spring 22 and the lever arm through which it acts thereby increasing the differential force which opposes the action of centrifugal force on the inertia weight and consequently so regulating the position of the eccentric as to provide for a higher speed. Reverse action of the motor reversely effects the tension and lever arms through which the springs 21 and 22 act thereby decreasing the differential force of the springs bucking the centrifugal force and bring about a condition in the governor which will maintain a lower rate of speed.

With the construction of this character a much wider range of available speeds may be maintained than with other governor constructions heretofore proposed and used and yet the governor is simple and compact and entirely reliable in its operation. It is easily constructed and may be readily assembled with the fly wheel and engine.

In order to damper and steady the action of the governor a dash pot 65 may be mounted on the fly wheel and have an arm 66 connected by links 67 to one side of the inertia weight. In this way the dash pot dampens or yieldably resists movement of the weight and consequently steadies and improves the action of the device.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A governor for use on steam engines having a main shaft and a fly wheel rotatable therewith and comprising an inertia weight pivotally supported on the fly wheel, a valve operating eccentric connected to said weight and shiftable therewith, a pair of springs anchored on the fly wheel, one of said springs being designed to supply more force than the other, slidable connections between said springs and said inertia weight, said springs having opposing reaction on said weight whereby the differential action of said springs opposes the influence of centrifugal force upon said weight, a reversible motor mounted on said fly wheel, and motion transmission means between said motor and said slidable connections to shift said connections along said weight relative to the pivotal support thereof.

2. A governor for use on steam engines having a main shaft and a fly wheel rotatable therewith and comprising an inertia weight pivotally supported on the fly wheel, said inertia weight being heavier on one side of its pivot than on the other, a valve operating eccentric connected to said weight and shiftable therewith, a pair of tension coil springs anchored on the fly wheel, one of said springs being designed to supply more force than the other, adjustable connections between said springs and portions of said inertia weight located on the opposite sides of its pivotal support, said adjustable connections including connecting elements shiftable toward and away from the pivotal axis of said inertia weight to vary the lever arms through which said springs act whereby the differential action which the springs opposed to the influence of centrifugal force on said weight may be varied, and means for shifting said adjustable connections.

3. A governor for use on steam engines having a main shaft and a fly wheel rotatable therewith and comprising an inertia weight pivotally supported on the fly wheel, said inertia weight being heavier on one side of its pivot than on the other, a valve operating eccentric connected to said weight and shiftable therewith, a pair of tension coil springs anchored on the fly wheel, one of said springs being designed to supply more force than the other, adjustable connections between said springs and portions of said inertia weight located on the opposite sides of its pivotal support, said adjustable connections including connecting elements shiftable toward and away from the pivotal axis of said inertia weight to vary the lever arms through which said springs act, means constraining said adjustable connections to partake of corresponding movement in opposite directions, and means for shifting said adjustable connections.

4. A governor for use on steam engines having a main shaft and a fly wheel rotatable therewith and comprising an inertia weight pivotally supported on the fly wheel, said inertia weight being heavier on one side of its pivot than on the other, a valve operating eccentric connected to said weight and shiftable therewith, a pair of tension coil springs anchored on the fly wheel, one of said springs being designed to supply more force than the other, adjustable connections between said springs and portions of said inertia weight located on the opposite sides of its pivotal support, said adjustable connections including connecting elements shiftable toward and away from the pivotal axis of said inertia weight to vary the lever arms through which said springs act, said inertia weight having means coacting with said shiftable connecting elements to vary the distance from the anchoring points of the springs directly as the change in said lever arms, and means for controlling the positions of said adjustable connections.

5. A governor for use on steam engines having a main shaft and a fly wheel rotatable therewith and comprising an inertia weight pivotally supported on the fly wheel, said inertia weight being heavier on one side of its pivot than on the other, a valve operating eccentric connected to said weight and shiftable therewith, a pair of tension coil springs anchored on the fly wheel, one of said springs being designed to supply more force than the other, tracks on said inertia weight extending toward and away from and located on the opposite sides of its pivotal axis, rollers connected with said springs and riding on said tracks, and means for shifting said rollers and holding them in adjusted position.

6. A governor for use on steam engines having a main shaft and a fly wheel rotatable therewith and comprising an inertia weight pivotally supported on the fly wheel, said inertia weight being heavier on one side of its pivot than on the other, a valve operating eccentric connected to said weight and shiftable therewith, a pair of tension coil springs anchored on the fly wheel, one of said springs being designed to supply more force than the other, tracks on said inertia weight extending toward and away from and on the opposite sides of its pivotal axis and slanting toward and away from the anchoring points of said springs, rollers connected to said springs and riding on said tracks, and means for controlling the position of said rollers on said tracks.

7. A governor for use with steam engines having a main shaft and a fly wheel rotatable with said main shaft and comprising an inertia weight, means pivotally supporting the inertia weight on the fly wheel with one side of the inertia weight heavier than the other, said inertia weight having slanting bars provided with tracks, a pair of tension coil springs, each coil spring having one end anchored on the fly wheel, an adjustable connection between the other end of each coil spring and the inertia weight and including a truck having rollers riding on said tracks, said coil springs being connected to said trucks, means for connecting said trucks together, an electric motor mounted on the fly wheel, and motion tranmission means between the motor and the trucks.

8. A governor for use on steam engines having a main shaft and a fly wheel secured thereto and rotatable therewith, an inertia weight pivotally supported on the fly wheel and comprising a hub having slanting bars and connecting structure between the slanting bars, an eccentric secured to the hub of the weight and shiftable therewith, differentially acting springs anchored to the fly wheel and adjustably connected with the slanting bars of the inertia weight, and means for adjusting said connections.

9. A governor for steam engines having a main shaft and a fly wheel secured to the main shaft and rotatable therewith and comprising an unbalanced inertia weight pivotally supported on the fly wheel, a differential spring arrangement, adjustable connections between the differential spring arrangement and the inertia weight, and means for adjusting said connections to change the point of application of the effective force of said spring arrangement on said weight relative to the pivotal support thereof.

10. A governor for use with steam engines having a main shaft and a fly wheel connected to said main shaft and rotatable therewith and comprising an unbalanced inertia weight pivotally supported on the fly wheel, an eccentric connected to said weight and controlled as to its position relative to the main shaft by the position of the inertia weight with respect to its axis of rotation, a differential spring arrangement between the fly wheel and the inertia weight, adjustable connections between said differential spring arrangement and the inertia weight designed to vary the differential tension and the effective lever arm of its application to said weight, and means for adjusting said connections.

11. A governor for use with steam engines having a main shaft and a fly wheel connected to said main shaft and rotatable therewith and comprising an unbalanced inertia weight pivotally supported on the fly wheel, an eccentric connected to said weight and controlled as to its position relative to the main shaft by the position of the inertia weight with respect to its axis of rotation, a differential spring arrangement between the fly wheel and the inertia weight, adjustable connections between said differential spring arrangement and the inertia weight designed to vary the differential tension and the effective lever arm of its application to said weight, and means for adjusting said connections and including an electric motor secured to the fly wheel and rotatable therewith, a speed reducer actuated by said motor and linkage actuated by said speed reducer and separately connected to one of said adjustable connections.

12. A governor of the character described comprising an inertia weight, means pivotally supporting the inertia weight and constraining it to rotate in synchronism with the engine, a valve operating eccentric connected with the inertia weight and controlled as to its position by the shifting of the inertia weight on its pivotal axis, a pair of tension coil springs, each spring having one end anchored, adjustable connections between the opposite ends of said springs and the inertia weight on the opposite sides of the pivotal axis of the latter, and means for shifting said adjustable connections along said weight and relative to said pivotal axis.

13. An engine governor of the character described comprising an inertia weight, a pivotal support therefor, said weight being heavier on one side of said support than on the other, means causing said pivotal support to revolve in synchronism with the engine, a differential spring arrangement connected to said weight on the opposite sides of its pivotal support, means for varying the differential action of said spring arrangement by shifting the points of application thereof on said weight relative to said pivotal support and means controlled by the position of the weight angularly with respect to its pivotal support for regulating the speed of said engine.

14. An engine governor of the character described comprising an inertia weight, a pivotal support therefor, said weight being heavier on one side of said support than on the other, means causing said pivotal support to revolve in synchronism with the engine, a differential spring arrangement connected to said weight on the apposite sides of its pivotal support, means for varying the lever arms through which the force of the springs of said arrangement is applied to said weight to vary the effective force which the spring arrangement opposes to the influence of centrifugal force on said weight and means controlled by the position of the weight angularly with respect to its pivotal support for regulating the speed of the engine.

15. An engine governor of the character described comprising an inertia weight, a pivotal support therefor, said weight being heavier on one side of said support than on the other, means causing said pivotal support to revolve in synchronism with the engine, a differential spring arrangement connected to said weight on the opposite sides of its pivotal support, means for shifting the points of connection of the springs of said spring arrangement toward and away from the pivotal axis of said weight and for simultaneously varying the tension of said springs, one spring being shifted toward said pivotal axis as the other is shifted away from the same and the tension of the springs being varied directly in accordance with their distance from said axis, and means controlled by the position of the weight angularly with respect to its pivotal support for regulating the speed of the engine.

16. In an engine governor, a pivoted weight adapted to regulate the action of a control valve under the influence of centrifugal force, a plurality of springs differentially acting upon said weight, and adjustable connections between said springs and said weight for varying the effective point at which the differential force of said springs is applied to said weight.

17. In an engine governor, a pivoted weight adapted to regulate the action of a control valve under the influence of centrifugal force, a plurality of springs differentially acting upon said weight, and relatively sloped sliding connections between said springs and said weight for varying the differential tension of said springs and the effective point of its application to said weight.

EVERETT C. READ.